April 4, 1967 W. KASTEN 3,312,350
FILTER ASSEMBLY SUMP DRAIN FLOW REGULATOR
Filed June 19, 1964
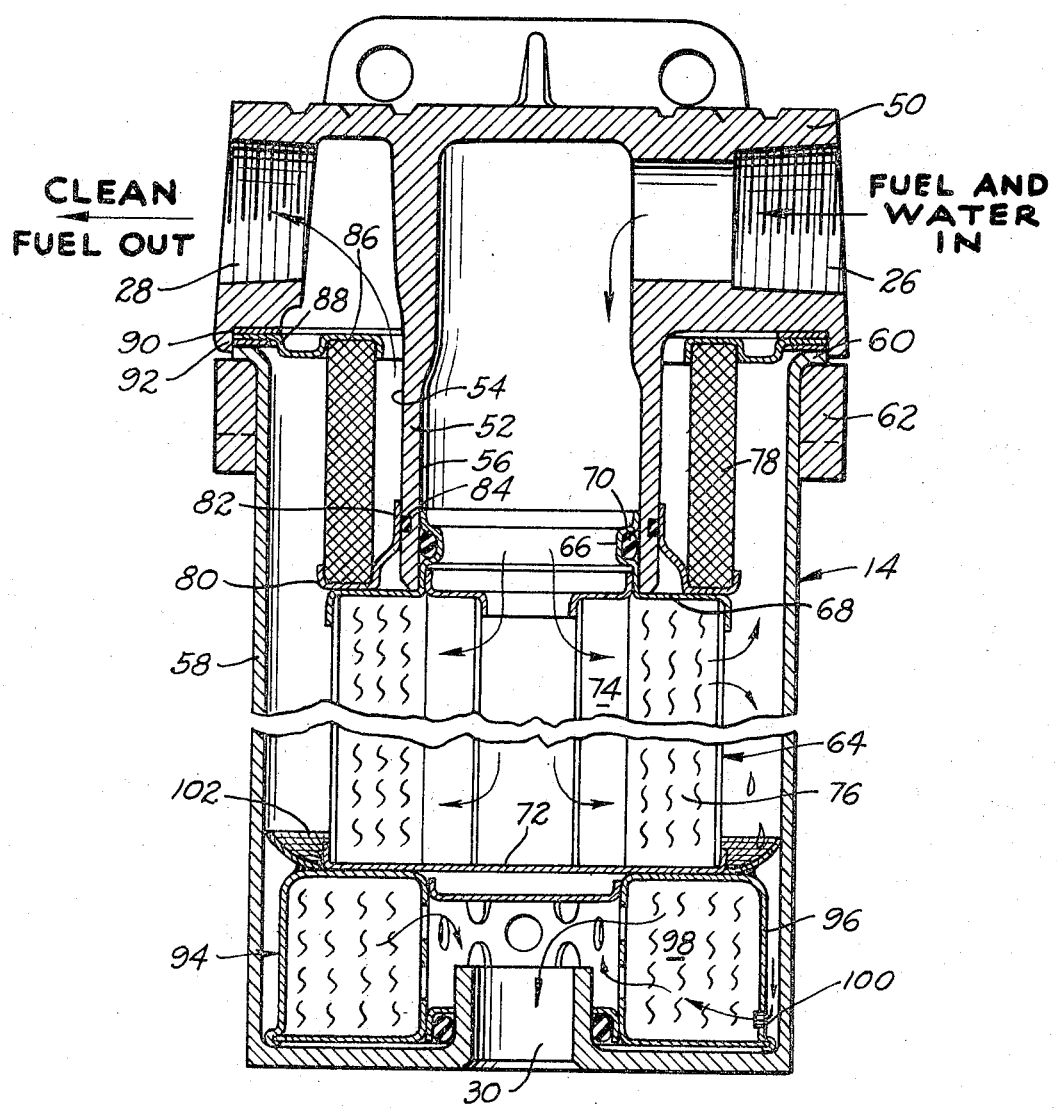
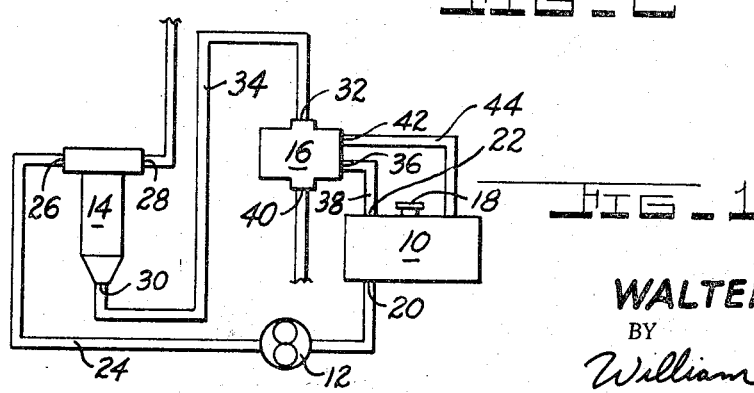
INVENTOR.
WALTER KASTEN.
BY
William N. Antonis
ATTORNEY.

United States Patent Office 3,312,350
Patented Apr. 4, 1967

3,312,350
FILTER ASSEMBLY SUMP DRAIN
FLOW REGULATOR
Walter Kasten, Madison Heights, Mich., assignor to The
Bendix Corporation, Madison Heights, Mich., a corporation of Delaware
Filed June 19, 1964, Ser. No. 376,508
3 Claims. (Cl. 210—307)

This invention relates to a flow regulator and more particularly to a flow regulator device for use in connection with the sump port of a fuel filter water separator.

In my copending application Ser. No. 337,401, filed Jan. 13, 1964, a fuel storage and dispensing system is disclosed which includes a fuel filter water separator unit and a water discharge device. In this system the sump line is equipped with a capillary type restrictor for regulating the flow of fluid through the sump port so that only a portion of the total flow passing through the fuel filter water separator unit is passed through to the water discharge device. To satisfy the pressure fuel flow needs of certain engines, it was found that a capillary tube 5/32" in diameter and 18 feet long was required. Such a capillary tube functions exceptionally well in restricting the flow therethrough without emulsifying the fuel-water mixture passing therethrough. However, the cost of such capillary tubing is relatively expensive, especially when stainless steel tubing is used in certain installations.

Accordingly, it is an object of this invention to provide a device which will accomplish essentially the same result as capillary tubing, but in a less expensive manner.

Another object of this invention is to provide a flow regulator device which will discharge the fuel water mixture passing therethrough in essentially the same demulsified condition that the mixture was in when it entered the device.

More specifically, it is an object of this invention to provide a flow regulator device which is operatively connected to the sump port of a fuel filter water separator unit comprising a casing having inlet and outlet passage means, said inlet passage means including a restricted flow metering orifice for regulating flow through said sump port, and coalescer means located within said casing and interposed between said inlet and outlet passage means for demulsifying the fuel water mixture which is emulsified while passing through said orifice.

The above and other objects and features of the invention will become apparent from the following description of the device taken in connection with the accompanying drawing which forms a part of this specification and in which:

FIGURE 1 is a schematic illustration of a typical fuel storage and dispensing system in which the invention is utilized; and FIGURE 2 is a sectional view of a fuel filter water separator unit in which my invention is incorporated.

Referring to FIGURE 1, it will be seen that the invention is shown in connection with a typical fuel storage and dispensing system which includes a fuel storage tank 10, a suitable pump 12, a fuel filter water separator unit 14 and a water discharge device 16 of the type disclosed in my copending application Ser. No. 337,401. The fuel storage tank 10 which is utilized for supplying fuel to the separator unit 14, includes a fill port 18, a discharge port 20 and a return port 22. A fuel line 24 comminucates discharge port 20 of the tank with the inlet port 26 of the fuel filter water separator unit 14. The fuel filter water separator also includes an outlet port 28 which can be suitably connected to an engine, and a sump port 30 which is suitably connected to the inlet port 32 of the water discharge device by a sump line 34. Suitable means, hereinafter described in detail, which will limit the flow of fluid through the sump line, are utilized so that only a portion of the total flow passing through the fuel filter water separator unit is passed through the water discharge device 16 via sump port 30. The proportion of the fluid to be returned by the sump line 34 in this manner, depends upon the maximum amount of water expected in the fuel. Thus, for example, if it is suspected that the fuel may contain as much as ten percent (10%) water, the restrictor would be so proportioned as to direct ninety percent (90%) of the flow through the fuel filter water separator outlet port 28 and ten percent (10%) through the fuel filter water separator sump port 30. If there is any likelihood that the water in the filter separator sump or return line might freeze, the flow regulating means could be proportioned so that the percentage of the flow return to the fuel tank via the sump port would be such that the fuel return through the sump port would exceed the maximum water concentration suspected or encountered in the fuel. The water discharge device 16, which receives the coalesced water and/or fuel from the sump port 30 of the fuel filter water separator unit, includes a fuel outlet port 36 which is connected by a return line 38 to the return port 22 of the fuel tank, a coalesced water drain port 40, and an air vent 42 which is connected to the top of the conventionally vented fuel tank 10 by a line 44.

Referring to FIGURE 2, which shows a sectional view of the fuel filter water separator unit 14, it will be seen that the numeral 50 indicates a filter head having the previously mentioned inlet port 26 and outlet port 28. A tubular member 52 extends from the filter head 50 and has the outer wall 54 thereof communicating with the outlet port 28 while the inner wall 56 of said tubular member communicates with the inlet port 26.

A filter bowl 58 having a radially outwardly projecting flange 60 at the open end thereof and the sump port 30 at the closed end thereof is suitably connected to the filter head 50 through a collar 62 which abuts the flange 60, and a plurality of bolts (not shown) which connect the collar to the filter head.

A substantially cylindrical coalescer element 64 of the inside-out flow type is located within the filter bowl 58 and is interposed between the inlet and outlet ports 26 and 28 for coalescing water contained in the fuel into relatively large droplets. A ferrule 66 is formed as a part of the upper coalescer end cap 68 and includes an O-ring 70 for sealingly engaging the inner wall 56 of the tubular member 52. Located at the lower end of the coalescer element, is an endcap 72. The coalescer element 64 is basically a pleated paper element 74 which is surrounded by a fiberglass batt 76. Since flow through the coalescer element is from the inside thereof to the outside thereof, as shown by the arrows, the pleated paper element 74 will retain most of the solid contaminants but will allow all free and emulsified water to flow therethrough. After flowing through the pleated paper element, the emulsified water passes through the fiberglass batt 76 and is coalesced into large droplets, most of which gravitate to the water sump 30. The fiberglass cylinder also retains the very fine solid contaminants (0.5-10 microns) which might have passed through the pleated paper element.

Downstream of the coalescer element is a substantially cylindrical Teflon coated wire mesh separator element 78 which permits flow of fuel therethrough but prevents flow of any water droplets therethrough. The Teflon coated screen, which has an affinity for fuel but not water, in effect "strips" the fuel of any water droplets which might have been carried upwards in the fuel. The separator element is arranged so that the lower endcap 80 thereof sits on the upper endcap 68 of the coalescer element, said lower endcap including an inwardly extending flange 82 which sealingly engages the tubular member 52 at 84. The upper endcap 86 of the separator elements includes an outwardly extending flange 88 which is clamped or confined between the head 50 and the bowl flange 60 and is in sealing engagement by virtue of a pair of gaskets 90 and 92.

Located within the filter bowl 58 and downstream of the coalescer element 64, is a flow regulator device 94 for regulating flow through the sump port 30 and consequently to the water discharge device 16. The device comprises a disc-shaped metal casing 96 containing a small doughnut shaped fiberglass coalescer element 98 and inlet and outlet connections. The inlet connection is a small metering orifice 100 in the outer diametrical surface of the casing calibrated to obtain the desired flow rate. As fuel and water flow through this orifice, it emulsifies. Since such emulsified fuel cannot be separated readily by the water discharge device 16, the doughnut shaped coalescer element 98 is utilized to separate the emulsions into large droplets of free water and fuel. The separate phases of free water and clear fuel will then flow at the metered rate to the water discharge device.

Although the fuel and water flowing through the metering orifice has passed through the main coalescing element 64 and is free of solid contamination, occasionally small particles are introduced during element replacements which might plug the metering orifice. To prevent this from occurring, a small wire screen collar 102 is attached to the top of the casing 96. The diameter of the screen holes should be about one-third of the diameter of the metering orifice.

Although there are several practical advantages which flow from the utilization of this invention in connection with this type of a fuel dispensing system, one of the most important is the fact that the flow regulating device disclosed and claimed herein costs about one-tenth of the cost of capillary tubing for performing essentially the same function.

Furthermore, although my invention has been described in connection with a specific embodiment, it will be obvious to those skilled in the art that various changes may be made in the form, structure, and arrangement of components without departing from the spirit of the invention. For example, the flow regulating device need not be placed in the filter water separator housing. It can also be located in the water discharge device or anywhere in the line between the fuel filter water separator sump port and the water discharge device. Accordingly, I do not desire to be limited to the specific embodiment disclosed herein primarily for purposes of illustration, but instead desire protection falling within the scope of the appended claims.

Having thus described the various features of the invention, what I claim as new and desire to secure by Letters Patent is:

1. A fuel filter water separator comprising a head having inlet and outlet ports, a bowl operatively connected to said head, said bowl having a water sump port therein, a coalescer element located in said bowl and interposed between said inlet and outlet ports for coalescing water retained in said fuel into relatively large droplets, a separator element located downstream of said coalescer element for permitting flow of fuel therethrough to said outlet port but preventing flow of said water droplets therethrough, and flow regulator means located in said bowl and downstream of said coalescer element for regulating flow through said sump port, said flow regulator means comprising a casing having inlet and outlet passage means, said inlet passage means including a restricted flow metering orifice, and coalescer means located within said casing and interposed between said inlet and outlet passage means for demulsifying the fuel water mixture which is emulsified while passing through said orifice.

2. A fuel filter water separator, as defined in claim 1 wherein said casing is shaped substantially in the form of a disc having a doughnut shaped fiberglass coalescer element therein and said restricted flow metering orifice is located in the outer diametrical surface of said casing.

3. A fuel filter water separator comprising a head having inlet and outlet ports, a tubular member operatively connected to and extending from said head, said tubular member having the inner wall thereof communicating with said inlet port, a bowl operatively connected to said head, said bowl having a water sump port therein, a coalescer element of the inside-out flow type located in said bowl and interposed between said inlet and outlet ports for coalescing water contained in said fuel into relatively large droplets, upper and lower endcap means located at opposite ends of said coalescer element, said upper endcap means of said coalescer element being in sealing engagement with said tubular member, a separator element of the outside-in flow type located downstream of said coalescer element for permitting flow of fuel therethrough to said outlet port but preventing flow of said water droplets therethrough, upper and lower endcap means located at opposite ends of said separator element, said lower endcap means of said separator element being in abutment with said upper endcap means of said coalescer element and in sealing engagement with said tubular member, said upper endcap means having a flange confined between said head and said bowl and in sealing engagement therewith, and flow regulator means located in said bowl and downstream of said coalescer element for regulating flow through said sump port, said flow regulator means comprising a casing in abutment with said lower endcap means of said coalescer element and the bottom of said bowl and having inlet and outlet passage means, said inlet passage means of said flow regulator means including a restricted flow metering orifice, and coalescer means located within said casing and interposed between said inlet and outlet passage means for demulsifying the fuel water mixture which is emulsified while passing through said orifice.

References Cited by the Examiner
UNITED STATES PATENTS

| | | | |
|---|---|---|---|
| 2,098,725 | 11/1937 | Hurn | 210—132 |
| 2,635,641 | 4/1953 | Kasten | 138—41 |
| 3,229,817 | 1/1966 | Pall | 210—307 X |
| 3,249,229 | 5/1966 | Kasten | 210—259 X |

RUEBEN FRIEDMAN, *Primary Examiner.*

F. SPEAR, *Assistant Examiner.*